United States Patent [19]

Liska et al.

[11] 3,942,081

[45] Mar. 2, 1976

[54] WINDING AND RE-WINDING APPARATUS USING A D.C. MOTOR WITH AN ELECTRONIC COMMUTATION DEVICE

[75] Inventors: Manfred Liska; Johann Grünleitner, both of Nurnberg, Germany

[73] Assignee: Siemens Aktiengesellschaft, Munich, Germany

[22] Filed: Sept. 26, 1974

[21] Appl. No.: 509,682

[30] Foreign Application Priority Data

Sept. 28, 1973 Germany............................ 2349003

[52] U.S. Cl. ..................... 318/7; 318/138; 318/254
[51] Int. Cl.² ......................................... H02K 29/00
[58] Field of Search........................ 318/6, 138, 254

[56] References Cited
UNITED STATES PATENTS

| | | | |
|---|---|---|---|
| 3,619,757 | 11/1971 | Ioerger et al. .................. | 318/138 X |
| 3,783,359 | 1/1974 | Malkiel .............................. | 318/254 |
| 3,860,187 | 1/1975 | Liska et al. ........................ | 318/6 X |

Primary Examiner—B. Dobeck
Attorney, Agent, or Firm—Kenyon & Kenyon Reilly Carr & Chapin

[57] ABSTRACT

This invention pertains to a D.C. motor with an electronic commutation device provided as the reversible D.C. motor used in winding and re-winding apparatus. The electronic commutation device polarity is determined in accordance with the polarity of a position control output signal. Furthermore, the absolute value of the position control output signal is formed and applied to regulate the speed of the D.C. motor.

1 Claim, 2 Drawing Figures

WINDING AND RE-WINDING APPARATUS USING A D.C. MOTOR WITH AN ELECTRONIC COMMUTATION DEVICE

BACKGROUND OF THE INVENTION

1. Field of the Invention

This invention relates generally to a winding and re-winding apparatus driven by a D.C. motor with an electronic commutation device. Specifically the invention pertains to control of a D.C. motor based on the polarity and absolute magnitude of a signal proportional to the deflection of a position sensing member.

2. Description of the Prior Art

Winding and re-winding devices are generally known. In such winding and re-winding apparatus a D.C. motor driving a winding or unwinding spool is controlled for the purpose of keeping constant the tension of the material being wound or unwound. Such a control must not only accelerate but also decelerate the spool if required. Therefore, the D.C. motor must be appropriately controlled by a position control. In the prior art, D.C. commutation machines have been used to drive the spool in the winding or re-winding apparatus. Control of the acceleration as well as the deceleration of the motors is possible only through the use of a closed-loop control system. This control system is switched appropriately as a function of the polarity of the position control output signal.

Due to the fact that commutation motors need constant servicing, it is advantageous to employ in their place maintenance-free brushless D.C. motors. However, a brushless D.C. motor cannot be reversed by simply reversing the polarity of the input voltage which makes impossible the simple replacement of a commutation motor by a brushless D.C. motor.

It is an object of this invention to create a winding and re-winding apparatus which is equipped with a brushless D.C. motor the speed of which can be accelerated as well as decelerated by a control loop driven by a position sensor.

SUMMARY OF THE INVENTION

According to the invention, the solution of the problem posed is found in a winding and re-winding apparatus of the above-described type by providing a D.C. motor with an electronic commutation device switched in accordance with the polarity of the position control output signal. This position control output signal is generated by a first amplifier signal which is proportional to the polarity of the position sensing output signal and by means of a second amplifier unit forming the absolute value of the position sensing output signal. These signals are then applied to the electronic commutation device which controls the speed of the brushless D.C. motor.

DESCRIPTION OF THE INVENTION

Figure 1:
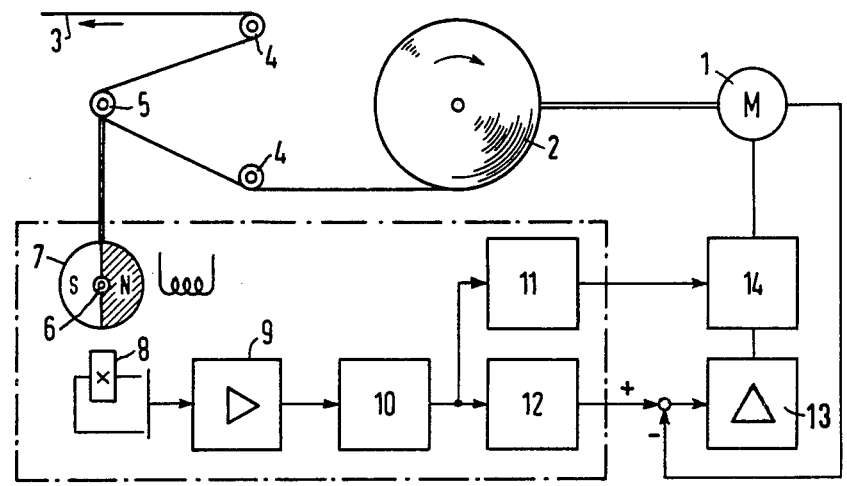
FIG. 1 is a block diagram of a winding and re-winding apparatus.

FIG. 1 shows a brushless D.C. motor 1 driving a spool 2 from which material 3 is wound or unwound. The material 3 being wound or unwound is led past a pendulum roller 5 by guide rollers 4. The pendulum roller 5 is pivoted about a shaft 6. A permanent magnet 7 with two-pole magnetization is mounted on the shaft 6. This permanent magnet is deflected in accordance with the deflection of the pendulum roller 5. The position of the permanent magnet 7 is sensed by a Hall-effect generator 8. The output signal supplied by the Hall-effect generator 8 is proportional to the position or deflection of the pendulum roller 5. The output signal of the Hall-effect generator 8 is fed to a position control circuit 10 by means of an amplifier 9. Connected to the output of the position control circuit 10 is a first amplifier unit 11 which determines the polarity of the position control output signal. The absolute value of the position control output signal is generated in a second amplifier unit 12. The output signal of the second amplifier unit is compared with the actual value of a signal proportional to the speed of the motor and the different signal is applied to a control amplifier stage 13. The output signal of the control amplifier stage 13 is applied to an electronic commutation device 14 well known in the prior art. The polarity of the commutation device 14 is controlled as a function of the first amplifier unit 11.

Figure 2:
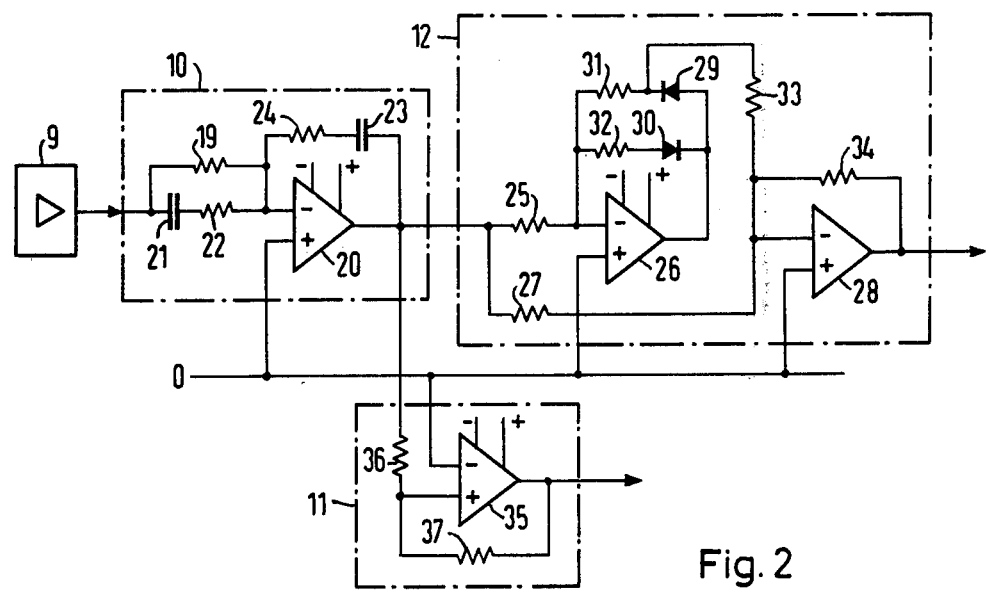
FIG. 2 is an electronic schematic diagram of a position control circuit and of the first and second amplifier units succeeding it.

Shown in FIG. 2 is a schematic diagram of the position control circuit 10, the first amplifier unit 11, and the second amplifier unit 12. Signals generated by amplifier 9 are applied to the inverting input terminal(−) of operational amplifier 20 by means of a first RC circuit consisting of a capacitor 21, a series resistor 22 and a shunt resistor 19. Negative feedback from the output of operational amplifier 20 to the inverting input is provided by means of a second RC circuit consisting of a capacitor 23 and a series resistor 24. The non-inverting input of operational amplifier 20 is connected to the reference potential 0.

The output of the operational amplifier 20 which forms the output of the position control circuit 10 is connected to the inverting input of a first operational amplifier 26 by means of a first input resistor 25 and to the inverting input of a second operational amplifier 28 of the second amplifier unit 12 by means of a second input resistor 27. The output of the first operational amplifier 26 is fed back to the inverting input of operational amplifier 26 by means of a two-way rectifier circuit consisting of two diodes 29 and 30 and two resistors 31 and 32. The reference potential 0 is applied to the non-inverting input of the operational amplifiers 26 and 28. The inverting input of the second operational amplifier 28 is additionally connected at a point between the diode 29 and the resistor 31 of the two-way rectifier circuit by means of an input resistor 33. The output of the second operational amplifier 28 is fed back negatively to the inverting input by means of a feedback resistor 34. The two operational amplifiers 26 and 28 together with their circuit components form the second amplifier unit 12. With a positive input at resistors 25 and 27, amplifier 26 inverts and has a negative output. The negative output is fed back through the diode 30 and resistor 32. The diode 29 blocks. Amplifier 28, at its inverting input has an input through the resistor 27. This positive voltage at that input will be inverted by the amplifier 28 to provide a negative output. If the input voltage is negative this negative voltage is inverted through the amplifier 26 and a positive voltage appears at its output and through the diode 29. Now, amplifier 28 will have a negative input through resistor 27 and a positive input through resistor 33. If the gain of amplifier 26 is made equal to two its output will be twice its input. When this is added to the negative voltage throught the resistor 27, the net result is a positive voltage which, again, results in a negative output. Circuits of this nature are well known by those skilled in the art and are discussed, for example, in "Applications Manual for Operational Amplifiers for Modeling, Measuring, Manipulating and Much Else," published by Philbrick Nexus Research 1968. In particular, see paragraph II.42.

The circuit shown labelled as 11 generates a signal proportional to the polarity of the signal from amplifier 9. This function can be performed by a limit switch i.e. a comparator or by a bistable flip-flop, but the preferred embodiment of unit 11 consists of an operational amplifier 35 to the inverting input of which the reference potential 0 is applied. The non-inverting input is connected with the output of the position control circuit 10 or operational amplifier 20 by means of a fourth input resistor 36. The output of this operational amplifier 35 is connected to the non-inverting input by means of a feedback resistor 37. This results in a positive feedback as is well known by those skilled in the art. By so coupling an operational amplifier it acts as a comparator. The inverting input is referenced to zero volts. If a positive input is applied to the non-inverting input a positive output results. As this is fed back it causes the amplifier to go more positive until saturation is reached. Thus, the amplifier will go to its maximum output voltage. Similarly for a negative input voltage, a negative output will result. Once again the positive feedback will cause the amplifier to go into saturation. Thus, any deviation from zero will result in an output from amplifier 35 of one or the other polarity depending on its input.

The device functions as follows. If through whatever influence the winding or unwinding speed of the material 3 being wound or unwound is altered, the pendulum roller 5 is deflected about the shaft 6. In accordance with this deflection the Hall-effect generator 8 transmits to the amlifier 9 a signal which is applied to the position control circuit 10. The signal received is amplified by the position control signal having a transfer function defined by the ratio of the feedback and feedforward impedances. The output of the positive control circuit 10 is applied to the first and the second amplifier units 11 and 12. The first amplifier unit 11 determines the polarity of the position control output signal and switches the commutation device 14 accordingly. In consequence of the switching of the commutation device 14, the individual phases of the stator windings of the brushless D.C. motor 1 will be energized in different sequence, thereby accomplishing a reversal of the stator field direction.

In the second amplifier unit 12 the absolute value of the position control output signal is formed. This absolute value is compared with a signal proportional to the motor's speed and fed to the control amplifier 13. Control amplifier 13 provides a magnitude signal to the commutation device 14 which applies the signal to the stator winding of the brushless D.C. motor 1.

Due to the switching of the commutation device 14 as a function of the polarity of the putput signal of the position control unit 10, the brushless D.C. motor is accelerated or decelerated. In addition the control amplifier 13 can function independently of the polarity of the output signal loop of the formation of the absolute value of the output signal of the position control circuit 10. Thus there has been shown novel apparatus for the control of a brushless D.C. motor in either a decelerating or accelerating mode.

What is claimed is:

1. In apparatus for winding and unwinding material to and from a spool and in which the winding or unwinding tension of the material is measured by a position sensing device, the improvement comprising:
   a. a brushless D.C. motor mechanically driving the spool;
   b. an electronic commutation device for energizing the stator windings of the brushless D.C. motor;
   c. means for converting the tension sensed by the position sensing device into a first electrical signal;
   d. a comparator comprising an operational amplifier having an input resistor coupled to its non-inverting input and a positive feedback resistor coupling its output to its non-inverting input for generating a polarity signal having the same polarity as said first electric signal;
   e. an absolute value circuit having said first electrical signal as an input said absolute value circuit comprising:
      1. a first operational amplifier having said first electrical signal coupled through an input resistor to its inverting terminal;
      2. a first diode and first feedback resistor in series coupling the output of said amplifier to said inverting input, said diode having a polarity such as to feedback negative signals;
      3. a second circuit feedback circuit comprising a second diode and second resistor coupling said output to said converting input said diode arranged to feedback positive signals;
      4. a second operational amplifier having its inverting input coupled through an input resistor to said first electrical signal;
      5. a second input resistor coupling a junction of one of said diodes and feedback resistors to said second amplifier inverting input; and
      6. a third feedback resistor coupling the output of said second amplifier to its inverting input;
   f. means for generating a speed signal proportional to the speed of the motor;
   g. means for generating an error signal, said means having as inputs said speed signal and the output of said absolute value circuit; and
   h. means for applying said polarity signal and the output of said means for generating an error signal to said electronic commutation device for energizing the stator windings of said D.C. motor in a sequence depending on said polarity signal and with an amplitude proportional to said error signal.

* * * * *